(12) United States Patent
Youn et al.

(10) Patent No.: US 8,855,639 B2
(45) Date of Patent: Oct. 7, 2014

(54) METHOD OF ALLOCATING CID FOR FAST HANDOVER

(75) Inventors: Ae Ran Youn, Anyang-si (KR); Ki Seon Ryu, Anyang-si (KR); Hee Jeong Cho, Anyang-si (KR); Tae Gon Kong, Anyang-si (KR)

(73) Assignee: LG Electronics Inc., Seoul (KR)

( * ) Notice: Subject to any disclaimer, the term of this patent is extended or adjusted under 35 U.S.C. 154(b) by 556 days.

(21) Appl. No.: 12/744,925

(22) PCT Filed: Nov. 24, 2008

(86) PCT No.: PCT/KR2008/006924
§ 371 (c)(1),
(2), (4) Date: Oct. 13, 2010

(87) PCT Pub. No.: WO2009/069922
PCT Pub. Date: Jun. 4, 2009

(65) Prior Publication Data
US 2011/0039563 A1    Feb. 17, 2011

Related U.S. Application Data

(60) Provisional application No. 60/990,612, filed on Nov. 27, 2007.

(30) Foreign Application Priority Data

Dec. 5, 2007 (KR) .................. 10-2007-0125736

(51) Int. Cl.
*H04W 36/00* (2009.01)

(52) U.S. Cl.
CPC .................. *H04W 36/0055* (2013.01)
USPC ........... 455/436; 455/453; 455/442; 370/331; 370/338; 370/395.3

(58) Field of Classification Search
USPC ........ 455/453, 436, 442; 370/331, 338, 395.3
See application file for complete search history.

(56) References Cited

U.S. PATENT DOCUMENTS

| | | |
|---|---|---|
| 7,123,721 B2 | 10/2006 | Panjwani et al. |
| 7,127,234 B2 | 10/2006 | Ishii |
| 7,631,186 B2 | 12/2009 | Okabe |
| 2002/0066011 A1 | 5/2002 | Vialen et al. |

(Continued)

OTHER PUBLICATIONS

Jiao, W., et al., "Fast Handover Scheme for Real-Time Applications in Mobile WiMAX", IEEE International Conference on Communications, pp. 6038-6042, Jun. 24, 2007.

(Continued)

*Primary Examiner* — Anthony Addy
*Assistant Examiner* — Natasha Cosme
(74) *Attorney, Agent, or Firm* — Lee, Hong, Degerman, Kang & Waimey

(57) ABSTRACT

A handover performing method and a method of allocating a connection identifier (CID) at the time of handover are disclosed. The method includes transmitting a handover request message to a serving base station, and receiving a handover response message including CID update information used in a target base station from the serving base station. At this time, the CID update information may include a transport CID (TCID) allocation start position and a TCID allocable value used in the target base station. Accordingly, it is possible to minimize service delay of a mobile station by providing a method of updating the CID of the mobile station for performing fast handover.

9 Claims, 10 Drawing Sheets

(56) References Cited

U.S. PATENT DOCUMENTS

| | | |
|---|---|---|
| 2004/0131037 A1* | 7/2004 | Balletti et al. ............... 370/338 |
| 2005/0079866 A1 | 4/2005 | Chen et al. |
| 2005/0197123 A1 | 9/2005 | Chang et al. |
| 2005/0197126 A1* | 9/2005 | Kang et al. ................... 455/442 |
| 2005/0208945 A1 | 9/2005 | Hong et al. |
| 2006/0160533 A1* | 7/2006 | Chou et al. ................. 455/422.1 |
| 2006/0172738 A1 | 8/2006 | Kwon et al. |
| 2007/0010262 A1 | 1/2007 | Kang et al. |
| 2007/0037576 A1 | 2/2007 | Subramanian et al. |
| 2007/0218896 A1 | 9/2007 | Altshuller et al. |
| 2007/0230707 A1 | 10/2007 | Blom et al. |
| 2007/0249352 A1 | 10/2007 | Song et al. |
| 2008/0299972 A1 | 12/2008 | Weese |
| 2009/0011790 A1 | 1/2009 | Lee et al. |
| 2009/0161555 A1 | 6/2009 | Chung |

OTHER PUBLICATIONS

U.S. Appl. No. 12/741,361, Final Office Action dated Jan. 3, 2013, 8 pages.

* cited by examiner

FIG. 3

| | MS1 | MS2 | MS3 | MS4 | MS5 | MS6 | ... | MSn |
|---|---|---|---|---|---|---|---|---|
| | 1 | 1 | 1 | 1 | 1 | 1 | | 1 |
| | 2 | 2 | 2 | 2 | 2 | 2 | | 2 |
| | 3 | 3 | 3 | 3 | 3 | 3 | | 3 |
| | 4 | 4 | 4 | 4 | 4 | 4 | | 4 |
| | 5 | 5 | 5 | 5 | 5 | 5 | | 5 |
| | 6 | 6 | 6 | 6 | 6 | 6 | | 6 |
| | 7 | 7 | 7 | 7 | 7 | 7 | | 7 |
| | 8 | 8 | 8 | 8 | 8 | 8 | | 8 |
| | 9 | 9 | 9 | 9 | 9 | 9 | | 9 |
| | 10 | 10 | 10 | 10 | 10 | 10 | | 10 |
| | 11 | 11 | 11 | 11 | 11 | 11 | | 11 |
| | 12 | 12 | 12 | 12 | 12 | 12 | | 12 |
| | 13 | 13 | 13 | 13 | 13 | 13 | | 13 |
| | 14 | 14 | 14 | 14 | 14 | 14 | | 14 |
| | 15 | 15 | 15 | 15 | 15 | 15 | | 15 |
| | 16 | 16 | 16 | 16 | 16 | 16 | | 16 |
| | 17 | 17 | 17 | 17 | 17 | 17 | | 17 |
| | 18 | 18 | 18 | 18 | 18 | 18 | | 18 |
| | 19 | 19 | 19 | 19 | 19 | 19 | | 19 |
| | 20 | 20 | 20 | 20 | 20 | 20 | | 20 |
| | 21 | 21 | 21 | 21 | 21 | 21 | | 21 |
| | 22 | 22 | 22 | 22 | 22 | 22 | | 22 |
| | 23 | 23 | 23 | 23 | 23 | 23 | | 23 |
| | 24 | 24 | 24 | 24 | 24 | 24 | | 24 |
| | 25 | 25 | 25 | 25 | 25 | 25 | | 25 |
| | 26 | 26 | 26 | 26 | 26 | 26 | | 26 |
| | 27 | 27 | 27 | 27 | 27 | 27 | | 27 |
| | 28 | 28 | 28 | 28 | 28 | 28 | | 28 |
| | 29 | 29 | 29 | 29 | 29 | 29 | | 29 |
| | 30 | 30 | 30 | 30 | 30 | 30 | | 30 |
| | 1 | 2 | 3 | 4 | 5 | 6 | ... | 2000 |

| | | | | | |
|---|---|---|---|---|---|
| ... | 1029 | 1059 | 1089 | 1119 | 1149 |
| 1000 | 1030 | 1060 | 1090 | 1120 | 1150 |
| 1001 | 1031 | 1061 | 1091 | 1121 | 1151 |
| 1002 | 1032 | 1062 | 1092 | 1122 | 1152 |
| 1003 | 1033 | 1063 | 1093 | 1123 | 1153 |
| 1004 | 1034 | 1064 | 1094 | 1124 | 1154 |
| 1005 | 1035 | 1065 | 1095 | 1125 | 1155 |
| 1006 | 1036 | 1066 | 1096 | 1126 | 1156 |
| 1007 | 1037 | 1067 | 1097 | 1127 | 1157 |
| 1008 | 1038 | 1068 | 1098 | 1128 | 1158 |
| 1009 | 1039 | 1069 | 1099 | 1129 | 1159 |
| 1010 | 1040 | 1070 | 1100 | 1130 | 1160 |
| 1011 | 1041 | 1071 | 1101 | 1131 | 1161 |
| 1012 | 1042 | 1072 | 1102 | 1132 | 1162 |
| 1013 | 1043 | 1073 | 1103 | 1133 | 1163 |
| 1014 | 1044 | 1074 | 1104 | 1134 | 1164 |
| 1015 | 1045 | 1075 | 1105 | 1135 | 1165 |
| 1016 | 1046 | 1076 | 1106 | 1136 | 1166 |
| 1017 | 1047 | 1077 | 1107 | 1137 | 1167 |
| 1018 | 1048 | 1078 | 1108 | 1138 | 1168 |
| 1019 | 1049 | 1079 | 1119 | 1139 | 1169 |
| 1020 | 1050 | 1080 | 1110 | 1140 | 1170 |
| 1021 | 1051 | 1081 | 1111 | 1141 | 1171 |
| 1022 | 1052 | 1082 | 1112 | 1142 | 1172 |
| 1023 | 1053 | 1083 | 1113 | 1143 | 1173 |
| 1024 | 1054 | 1084 | 1114 | 1144 | 1174 |
| 1025 | 1055 | 1085 | 1115 | 1145 | 1175 |
| 1026 | 1056 | 1086 | 1116 | 1146 | 1176 |
| 1027 | 1057 | 1088 | 1117 | 1147 | 1177 |
| 1028 | 1058 | 1089 | 1118 | 1148 | ... |

MS1, MS2, MS3, MS4, MS5, MS6, MS7, MS8

: MS1
: MS2
: MS3; HO to other BS
: MS4
: MS5; HO to other BS
: MS6
: MS7
: MS8

METHOD OF ALLOCATING CID FOR FAST HANDOVER

CROSS-REFERENCE TO RELATED APPLICATIONS

This application is the National Stage filing under 35 U.S.C. §371 of International Application No. PCT/KR2008/006924, filed on Nov. 24, 2008, which claims the benefit of earlier filing date and right of priority to Korean Application No. 10-2007-0125736, filed on Dec. 5, 2007, and also claims the benefit of U.S. Provisional Application Ser. No. 60/990,612, filed on Nov. 27, 2007.

TECHNICAL FIELD

The present invention relates to a handover performing method, and more particularly, to a method of allocating a connection identifier (CID) to a mobile station when handover is performed.

BACKGROUND ART

Hereinafter, a handover and ranging procedure will be briefly described.

Handover indicates a function for maintaining a communication call when a mobile station (MS) moves in a zone such as a cell of a base station (BS) to the zone of another BS during the communication call (a function for switching a channel or a line and continuously maintaining a call).

The handover may be divided into softer handover, soft handover and hard handover.

At this time, the softer handover indicates handover which is performed in one cell and indicates that an MS switches a used channel to a good channel within a cell coverage. The soft handover indicates that two adjacent channels are simultaneously operated and then one of the channels is gradually disconnected. The soft handover can be readily implemented because the same frequency band is used in a code division multiple access (CDMA). The hard handover indicates that a channel which is currently used is disconnected and then another channel is immediately connected.

When the MS moves from the cell of a BS which currently provides a service, to the cell of another BS, the MS performs a ranging procedure after performing handover to another BS.

The ranging indicates a set of processes of maintaining connection quality (in particular, synchronization) of radio frequency (RF) communication between a BS and an MS. Ranging is not problematic at the time of multiple access based on an OFDMA/TDD scheme because the BS transmits a signal to several MSs in downlink. However, in uplink, since several MSs transmit respective signals, propagation delay is changed according to the MSs. Accordingly, the BS and the MSs perform ranging by separate timing synchronization methods. That is, the ranging procedure is a procedure of correcting synchronization of transmission times of the several MSs.

For uplink synchronization acquisition and power control between the BS and the MSs, the ranging includes initial ranging, periodic ranging and hand-off (HO) ranging. The ranging further includes bandwidth request (BR) ranging for, at the MS, requesting a bandwidth to the BS.

The initial ranging is used for initial network entrance and connection when the MS first enters the BS (e.g., the power of the MS is turned on or a sleep mode is switched to an idle mode). The periodic ranging is periodically transmitted from the MS to the BS for synchronization tracking. The HO ranging is performed by the MS for synchronization with a target BS during handoff. The BR ranging is transmitted to the BS for requesting uplink allocation. The BR ranging is transmitted from only MSs which was already synchronized with the system.

When the BS receives a ranging request message from an MS, the BS generates a connection identifier (CID) of the MS. Thereafter, the BS performs renegotiation, re-authentication and re-registration processes with the MS.

The CID indicates an address for distinguishing and identifying connections mapped to a necessary service flow between peer entities on a MAC sub-layer. The CID is located in an MAC PDU header. That is, all the connections between the BS and the MSs are identified by the CID included in the MAC header and the CID corresponds to a service flow identifier (SFID) for defining service flow quality of service (QoS) parameters associated therewith.

A management CID may be allocated from the BS to the MSs when all the MSs are initially connected to the BS. That is, the MSs may receive the management CID from the BS by a series of ranging and registering processes. The management CID may be divided into a basic CID, a primary CID and a secondary CID.

At this time, the basic CID (BCID) is used when the BS identifies the MS in an initial connection stage. That is, the MAC address of the MS is mapped to the BCID. The primary CID (PCID) may be used in an authentication message and messages associated with dynamic resource allocation. The secondary CID (SCID) is optional and, in an MS capability negotiating process, it may be determined whether or not the SCID is used.

In addition to the management CID, the CID includes a transport CID (TCID) for identifying a user traffic service, a broadcasting CID (BCID) for identifying broadcasting traffic and a multicasting CID (MCID). The TCID may be allocated in every connection generated between the MSs and the BS.

Generally, an MS performs handover from a serving BS to a target BS, and the target BS acquires synchronization via ranging and updates CIDs used in the target BS. As a communication technology has been developed, there is a need for a method of performing fast handover in order to reduce a delay time at the time of handover.

Accordingly, in order to perform faster handover and ranging, there is a need for a method of allocating a new CID in addition to a method of allocating a CID which is generally used.

DISCLOSURE

Technical Problem

An object of the present invention devised to solve the problem lies on a method of efficiently allocating a connection identifier (CID) of a mobile station (MS) which performs handover.

Another object of the present invention devised to solve the problem lies on a method of efficiently updating a CID at a target base station (TBS) by providing a CID of an MS which performs fast handover to the MS before a ranging procedure.

Technical Solution

The object of the present invention can be achieved by providing a method of allocating a connection identifier (CID) at the time of handover, the method including: transmitting a handover request message to a serving base station; and receiving a handover response message including CID update information used in a target base station from the serving base station. At this time, the CID update information may include a transport CID (TCID) allocation start position and a TCID allocable value used in the target base station.

The CID update information may further include a basic CID (BCID) and a primary CID (PCID). At this time, the TCID allocable value may be represented by a bitmap string having a length of at least one bit. The TCID allocable value may be allocated in order of a lowest transmission zone to a highest transmission zone. The TCID allocable value may be allocated on the basis of a service flow identifier.

In another aspect of the present invention, provided herein is a method of allocating a connection identifier (CID) at the time of handover, the method including: receiving a handover request message from a mobile station; transmitting a message including information about a transport CID (TCID) allocated to the mobile station to a target base station; receiving CID update information used in the target base station from the target base station; and transmitting a handover response message including the CID update information used in the target base station to the mobile station. The CID update information may include a TCID allocation start position and a TCID allocable value used in the target base station.

The TCID allocable value may be represented by a bitmap string having a length of at least one bit. The TCID allocable value may be represented in the unit of 8 bits.

Advantageous Effects

The present invention includes the following effects.

It is possible to minimize service delay of a mobile station by providing a method of updating a connection identifier (CID) of the mobile station for performing fast handover. For example, it is possible to readily perform a ranging process after handover by updating the CIDs of the mobile station at a target base station in advance in a process of performing handover.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a view showing an example in which a target BS allocates transport CIDs (TCIDs) to a plurality of MSs included in its cell.

FIG. 4 is a view showing another example in which a target BS allocates TCIDs to a plurality of MSs included in its cell.

FIG. 6 is a view showing a method of updating TCIDs of a fast handover target MS MS7, according to an embodiment of the present invention.

FIG. 8 is a view showing a method of updating TCIDs of a fast handover target MS MS8, according to another embodiment of the present invention.

MODE FOR INVENTION

Figure 1:
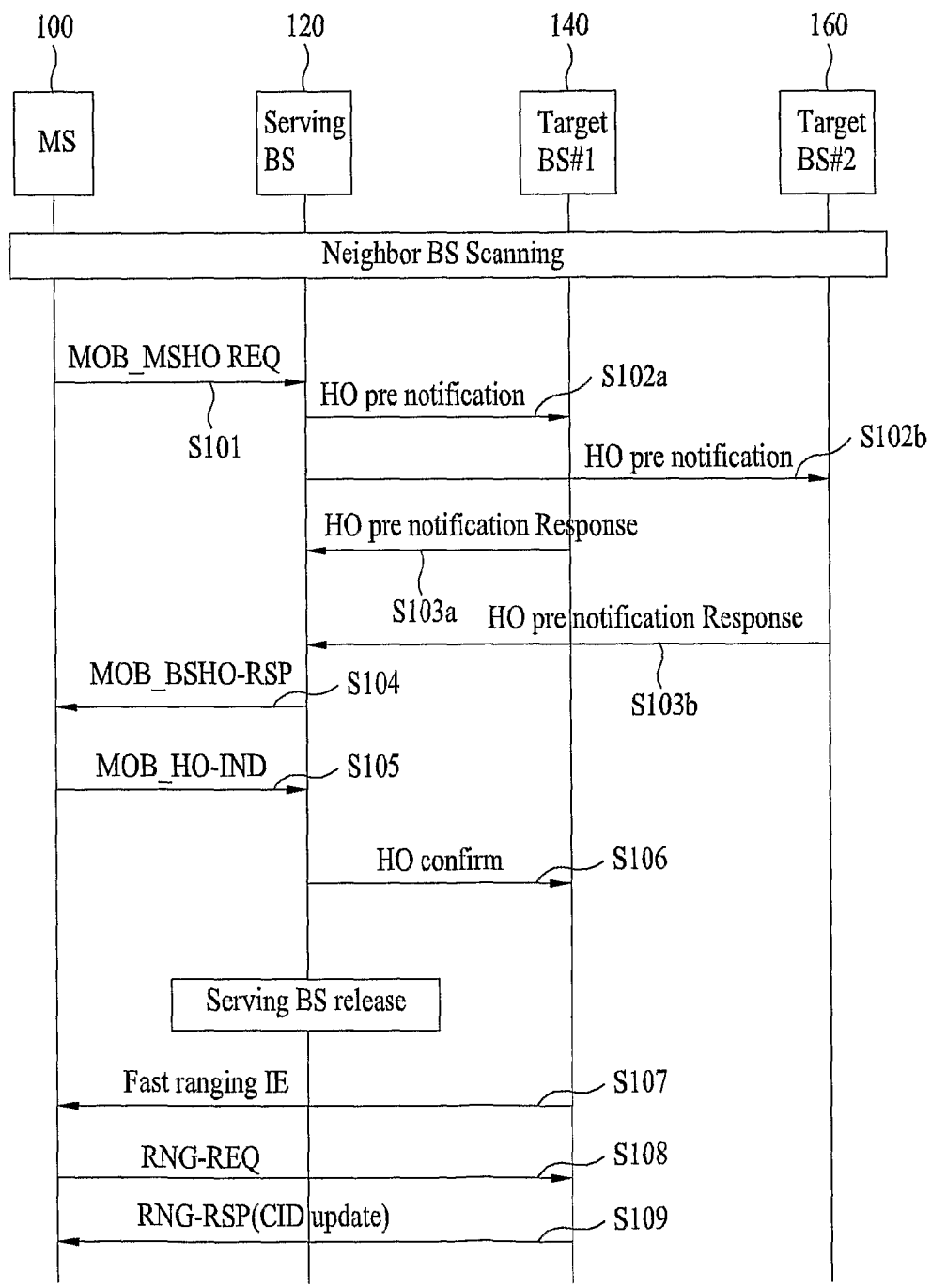
FIG. 1 is a view showing a fast handover procedure between a mobile station (MS) and a base station (BS).

The present invention relates to various methods of allocating a connection identifier (CID) to a mobile station (MS) when fast handover is performed.

The following embodiments are realized by combinations of components and features of the present invention in a predetermined form. It may be considered that the components or the features are optional unless specially noted. The components or the features may be implemented without being combined with other components or features. The embodiments of the present invention may be realized by combinations of portions of the components and/or features. The sequence of the operations described in the embodiments of the present invention may be changed. Portions of the components and features of any embodiment may be included in other embodiments or may be replaced with the components or features corresponding to the other embodiments.

In the present specification, the embodiments of the present invention will be described concentrating on a relationship between transmission and reception of data between a base station (BS) and a mobile station (MS). The BS indicates a terminal node of a network for directly performing communication with the terminal. In the present specification, a specific operation which is performed by the BS may be performed by an upper node of the BS, if necessary.

That is, various operations which are performed for communication with the terminal in a network configured by a plurality of network nodes including the BS may be performed by the BS or other network nodes except the BS. At this time, the term "BS" may be replaced with a fixed station, a Node-B, an eNode-B (eNB) or an access point. The term "mobile station (MS)" may be replaced with a user equipment (UE), a subscriber station (SS) or a mobile subscriber station (MSS).

The embodiments of the present invention may be implemented by various units. For example, the embodiment of the present invention may be implemented by hardware, firmware, software or a combination thereof.

In the implementation using hardware, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers or microprocessors.

In the implementation using firmware or software, the methods according to the embodiments of the present invention may be implemented in the form of modules, procedures or functions for performing the above-described functions or operations. A software code may be stored in a memory unit and operated by a processor. The memory unit may be located inside or outside the processor so as to exchange data with the processor by various known units.

The embodiments of the present invention are supported by standard documents disclosed in at least one of the Institute of Electrical and Electronic Engineers 802 (IEEE802) system, the 3$^{rd}$ generation partnership project (3GPP) system, the 3GPP LTE system and the 3GPP2 system, all of which are radio access systems. That is, the steps or the portions of the embodiments of the present invention which are not described in order to clarify the technical spirit are supported by the above-described documents. All the terms disclosed in the present specification may be described by the above-described standard documents. In particular, the embodiments of the present invention are supported by the standard documents such as the P802.16-2004, P802.16e-2005 and P802.16Rev2, all of which are the standard documents of the IEEE802.16 system.

The specific terms used in the following description are provided in order to facilitate the understanding of the present invention and may be changed in other forms without departing from the technical scope of the present invention.

Hereinafter, various embodiments of the present invention will be described with reference to the accompanying drawings. If it is determined that the detailed description of a related known function or construction renders the scope of the present invention unnecessarily ambiguous, the detailed description thereof will be omitted.

FIG. 1 is a view showing a fast handover procedure between an MS and a BS.

Referring to FIG. 1, an MS 100 is currently connected to a serving BS 120. Handover to a first target BS#1 140 or a second target BS#2 160 which is a neighbor BS will be performed.

The serving BS 120 broadcasts information about a network configuration to all MSs in a cell via an MOB_NBR-ADV MAC message. The MSs belonging to the serving BS 120 receive an MOB_NBR-ADV MAC message so as to acquire information about the neighbor BSs (e.g., the first target BS 140 and the second target BS 160).

The MS 100 scans the neighbor BSs in order to perform the handover. The MS 100 may perform the handover on the basis of channel quality information of the neighbor BSs acquired by the scanning.

The handover may be performed by the MS 100 or the serving BS 120. The MS transmits a handover request message (e.g., a MOB_MSHO-REQ MAC message) to the BS in order to request the handover. At this time, the MOB_MSHO-REQ MAC message may include the channel state information of a signal received from the neighbor BSs (S101).

If the serving BS 120 receives the MOB_MSHO-REQ MAC message from the MS 100, the serving BS 120 recognizes that the MS 100 requests the handover. Accordingly, the serving BS 120 transmits a handover pre-notification message (e.g., HO pre notification message) to the first target BS 140 and the second target BS 160 which are the handover target BSs (S102a and S102b).

The target BSs which receive the handover pre-notification message in the step S102 transmit a response message (e.g., HO pre notification response message) to the serving BS 120 (S103a and S103b).

If the serving BS 120 receives an acknowledgement signal for performing the handover from the target BSs (140 and 160), the serving BS 120 transmits a handover response message (e.g., MOB_BSHO-RSP message) to the MS 100 (S104).

At this time, the BS may specify a target BS and notify the MS of the target BS in the step S104 or the MS may confirm the received handover response message and decide a target BS in the step S104. In the embodiment of the present invention, it is assumed that the MS decides the target BS.

The MS 100 decides the target BS to which the handover will be performed (e.g., the first target BS). The MS may transmit information about the target BS 140, to which the handover will be performed, to the serving BS 120 via a handover indication message (e.g., an MOB_HO-IND message) (S105).

The serving BS 120 transmits information indicating whether or not the handover of the MS 100 is performed to the first target BS 140 via a handover confirm (HO confirm) message.

Thereafter, the serving BS 120 finishes all connections associated with data transmission and an ARQ connection allocated to the MS 100.

The first target BS 140 transmits fast ranging information (e.g., fast ranging IE) to the MS 100 such that the MS 100 performs fast handover. The target BS 140 transmits the fast ranging IE using a handover identifier or an MAC address of the MS 100 such that a non-competitive initial ranging procedure is performed and an uplink region to which an RNG-REQ MAC message of the MS will be transmitted is represented (S107).

Generally, the MS 100 which tries to perform the handover transmits a handover CDMA ranging code to the first target BS 140 to which the handover will be performed. In the step S107, the first target BS 140 may transmit the fast ranging information to the MS 100 such that a procedure of transmitting a CDMA ranging code is omitted. If the first target BS 140 can successfully perform ranging with the MS, the first target BS 140 broadcasts a ranging response message (e.g., an RNG-RSP MAC message) and transmits CDMA allocation information (CDMA Alloc IE) to the MS 100.

The MS 100 receives the fast ranging information or the CDMA allocation information from the first target BS 140 and then transmits a ranging request message (e.g., an RNG-REQ message) to the first target BS in order to perform the ranging procedure. At this time, the RNG-REQ message may include a handover identifier (HO ID) or an MAC address of the MS 100 and CMAC information for authentication of the MS 100 (S108).

The target BS 140 which receives the RNG-REQ MAC message from the MS 100 generates a CID of the MS 100. In addition, the target BS 140 may notify the MS 100 whether or not renegotiation, re-authentication and re-registration processes with the MS 100 are omitted via an RNG-RSP MAC message. At this time, the MS 100 may know whether or not renegotiation, re-authentication and re-registration processes with the first target BS 140 are omitted via a parameter (e.g., HO process optimization) included in the RNG-RSP MAC message (S109).

In the step S109, the first target BS 140 may generate the CID of the MS which tries to perform the handover to its cell and transmit the CID to the MS. By such a process, the MS may update the information about the CID allocated to the MS.

By performing the handover procedure described in FIG. 1, the MS may perform the fast handover with the first target BS. As the function of the MS is improved and a communication environment is improved, the performance of the faster handover is required.

Accordingly, the embodiment of the present invention suggests a method of performing a procedure performed in the ranging process of FIG. 1 in the step of performing the handover, for fast handover. For example, a method of performing the CID updating process of the RNG-REQ/RSP process in the step S104 or S107 of FIG. 1 is suggested.

That is, the MS 100 may receive an MOB_BSHO-RSP message including information about a BCID, a TCID allocation start position and a TCID allocable value used in the neighbor BSs from the serving BS 120 and automatically update the CID by the first target BS after handover on the basis of the MOB_BSHO-RSP message.

In addition, the MS 100 may directly receive a fast ranging IE including CID information including information about a BCID, a TCID allocation start position and a TCID allocable value used in the first target BS 140 from the first target BS 140 and automatically update the CID after handover.

Figure 2:
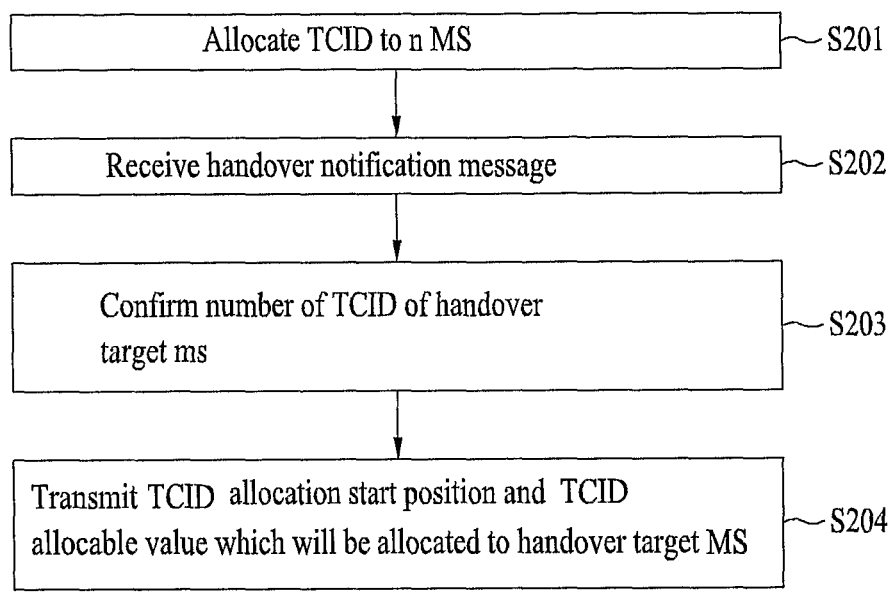
FIG. 2 is a view showing a method of allocating a connection identifier (CID) to an MS which currently performs handover, according to an embodiment of the present invention.

FIG. 2 is a view showing a method of allocating a CID to an MS which currently performs handover, according to an embodiment of the present invention.

Referring to FIG. 2, a target BS allocates the CID to n MSs included in its cell. The CID allocated to the MSs includes a BCID, a PCID and a TCID. The BCID and the PCID are allocated to the MSs one by one. If the number of connections per MS, which can be simultaneously generated by a plurality of MSs, is 30, 30 TCIDs may be allocated to each MS (S201).

Hereinafter, a TCID allocation method used in the step S201 will be described.

FIG. 3 is a view showing an example in which a target BS allocates TCIDs to a plurality of MSs included in its cell.

In FIG. 3, it is assumed that 2000 MSs are included in a cell of the target BS. At this time, for example, it is assumed that the TCIDs are allocated to six MSs.

If the maximum number of connections which can be generated by the MSs included in the cell is 30, 2000 BCIDs, 2000 PCIDs and 60000 TCIDs may be generated in one cell. Accordingly, a maximum of 32 CIDS (one BCID, one PCID and 30 TCIDs) may be allocated to each MS.

FIG. 3 shows a method of collectively allocating a maximum number of TCIDs which may be allocated to each MS. For example, the target BS may allocate a group of 30 TCIDs, which may be generated by each MS, to each MS.

In FIG. 3, it is assumed that the number of connections which are generated by MS1 and the target BS is 25, the number of connections which are generated by MS2 and the target BS is 30, the number of connections which are generated by MS3 and the target BS is 10, the number of connections which are generated by MS4 and the target BS is 22, the number of connections which are generated by MS5 and the target BS is 15, and the number of connections which are generated by MS6 and the target BS is 13. At this time, each MS requires TCIDs of the number corresponding to the number of connections.

Referring to FIG. 3, it can be seen that 30 TCIDs are allocated to MS1, MS2, MS3, MS4, MS5 and MS6. That is, the BS may collectively allocate 30 TCIDs regardless of the actual number of connections generated by the MSs.

Figure 4:
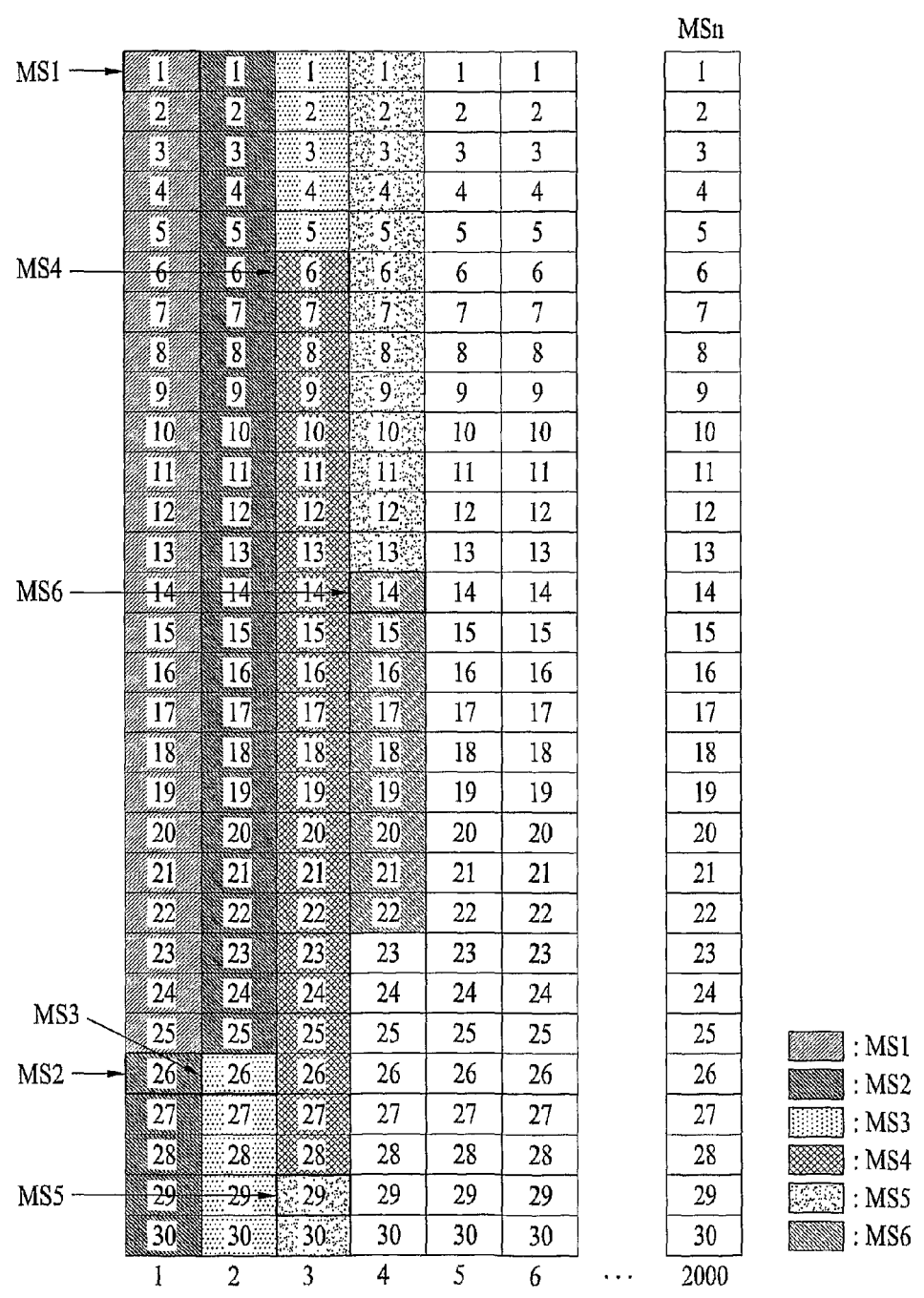

FIG. 4 is a view showing another example in which a target BS allocates TCIDs to a plurality of MSs included in its cell.

In FIG. 4, the type and the number of CIDs necessary for the MSs are equal to those of FIG. 3. The target BS may notify the MSs of start indexes of the TCIDs and the number of TCIDs in order to allocate the TCIDs to the MSs. In FIG. 4, the TCIDs are sequentially filled from a small number of each column and then are allocated in a next column if one column is filled up.

It is assumed that the number of connections which are generated by MS1 and the target BS is 25, the number of connections which are generated by MS2 and the target BS is 30, the number of connections which are generated by MS3 and the target BS is 10, the number of connections which are generated by MS4 and the target BS is 22, the number of connections which are generated by MS5 and the target BS is 15, and the number of connections which are generated by MS6 and the target BS is 13. At this time, each MS requires TCIDs of the number corresponding to the number of connections.

Referring to FIG. 4, the target BS may notify the MSs of a TCIP allocation start position and the number of TCIDs in order to allocate the TCIDs to the MSs. For example, the target BS notifies the MSs of the TCID allocation start position and notifies that the number of TCIDs allocated is 25, in order to allocate the TCIDs to the MS1.

For example, the target BS may notify that the TCID allocation start position of MS1 is "1" of a first column and 25 TCIDs are allocated and that the TCID allocation start position of MS2 is "26" and 30 TCIDs are allocated. Accordingly, MS1 may use a first TCID to $25^{th}$ TCID and MS2 may use a $26^{th}$ TCID to a $25^{th}$ (that is, $55^{th}$) TCID of a next column. By such a method, the target BS may allocate the TCIDs to the MSs.

In FIG. 4, another method of, at the target BS, allocating the TCIDs to each MS is as follows. The target BS may notify the TCID allocation start position and each TCID allocation position to each MS in a bitmap manner.

For example, if the target BS allocates the first TCID to the $25^{th}$ TCID to the MS1, the target BS may transmit a bitmap string (e.g., 11111111/11111111/11111111/10000000) indicating that the TCID allocation start position of MS1 is "1" and 25 TCIDs are allocated to MS1. At this time, the bitmap may have any length. In the embodiment of the present invention, the bitmap is represented in the unit of 8 bits and the bits which remain after allocation of the TCIDs are filled by "0".

A method of allocating the TCIDs to MS3 will now be described. The target BS may transmit to MS3 a bitmap (e.g., 11111111/11000000) indicating that the TCID allocation start position is "26" of a second column and 10 TCIDs are allocated to MS3. Using such a method, it is possible to allocate the TCIDs to all the MSs included in the cell of the target BS.

Figure 5:
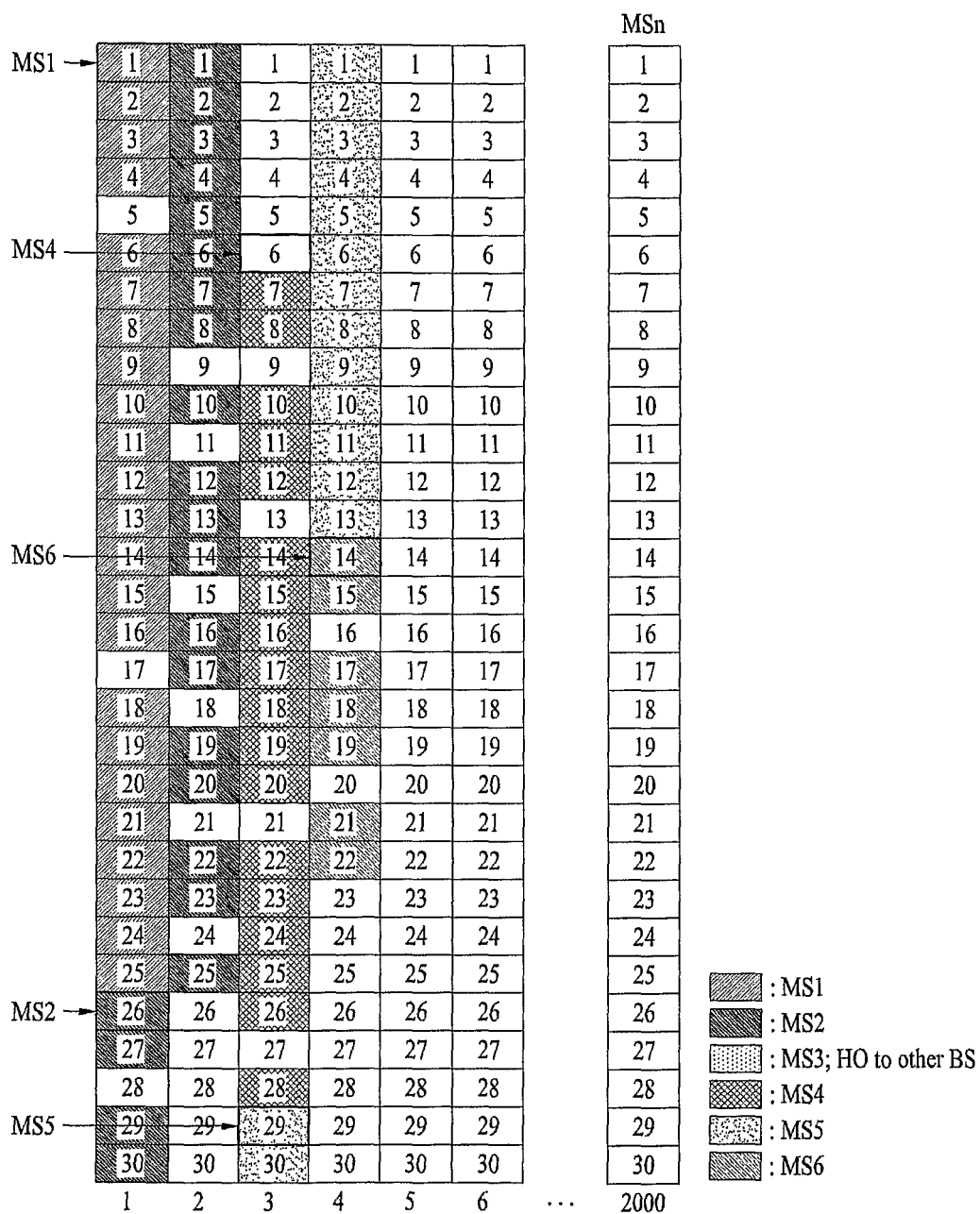
FIG. 5 is a view showing a case where TCIDs allocated to the MSs are changed according to communication states after the TCID is allocated to the MSs using a method of, at a target BS, transmitting only a TCID start position and the number of allocated TCIDs in FIG. 4.

FIG. 5 is a view showing a case where the TCIDs allocated to the MSs are changed according to communication states after the TCIDs are allocated to the MSs using the method of, at the target BS, transmitting only the TCID start position and the number of allocated TCIDs in FIG. 4.

In FIG. 5, it is assumed that the method of, at the target BS, allocating the TCIDS to the MSs and the number of TCIDS allocated to the MSs are the same. If the TCIDs are allocated to the MSs using the method of FIG. 4, it is possible to improve the efficiency of a communication resource compared with the method of FIG. 3. However, the MSs included in the cell of the target BS may release the connection with the target BS. In addition, if the number of TCIDS of the MS which tries to perform handover to the target BS is larger than the number of TCIDs allocated to the MS which moves to another BS, the TCIDS released from the previous MS may not be efficiently allocated.

Referring to FIG. 5, MS3 of FIG. 4 moves to the cell of another BS and the TCIDs allocated to MS3 are released. In addition, portions having no mark of the regions of the TCIDs allocated to the MSs indicate disconnected portions.

Referring to FIG. 2 again, the MS (e.g., MS7) belonging to the cell of the serving BS may move the cell of the target BS. In this case, the target BS may receive a handover notification message via a backbone network connected to the serving BS (S202).

The serving BS may include the number of TCIDs allocated to the handover target MS by the serving BS in the handover notification message transmitted in the step S202. Accordingly, the target BS recognizes the number of TCIDs which will be allocated to the MSs (S203).

The target BS may update and transmit the TCID allocation start position and TCID allocable value of the TCIDs which will be allocated to the handover target MS to the MS (S204). The TCID allocable value updated in the step S204 may be represented by the bitmap.

Hereinafter, a method of updating the TCIDs of a handover target MS for fast handover (fast HO) when the MS enters the cell of the target BS will be described.

Figure 6:
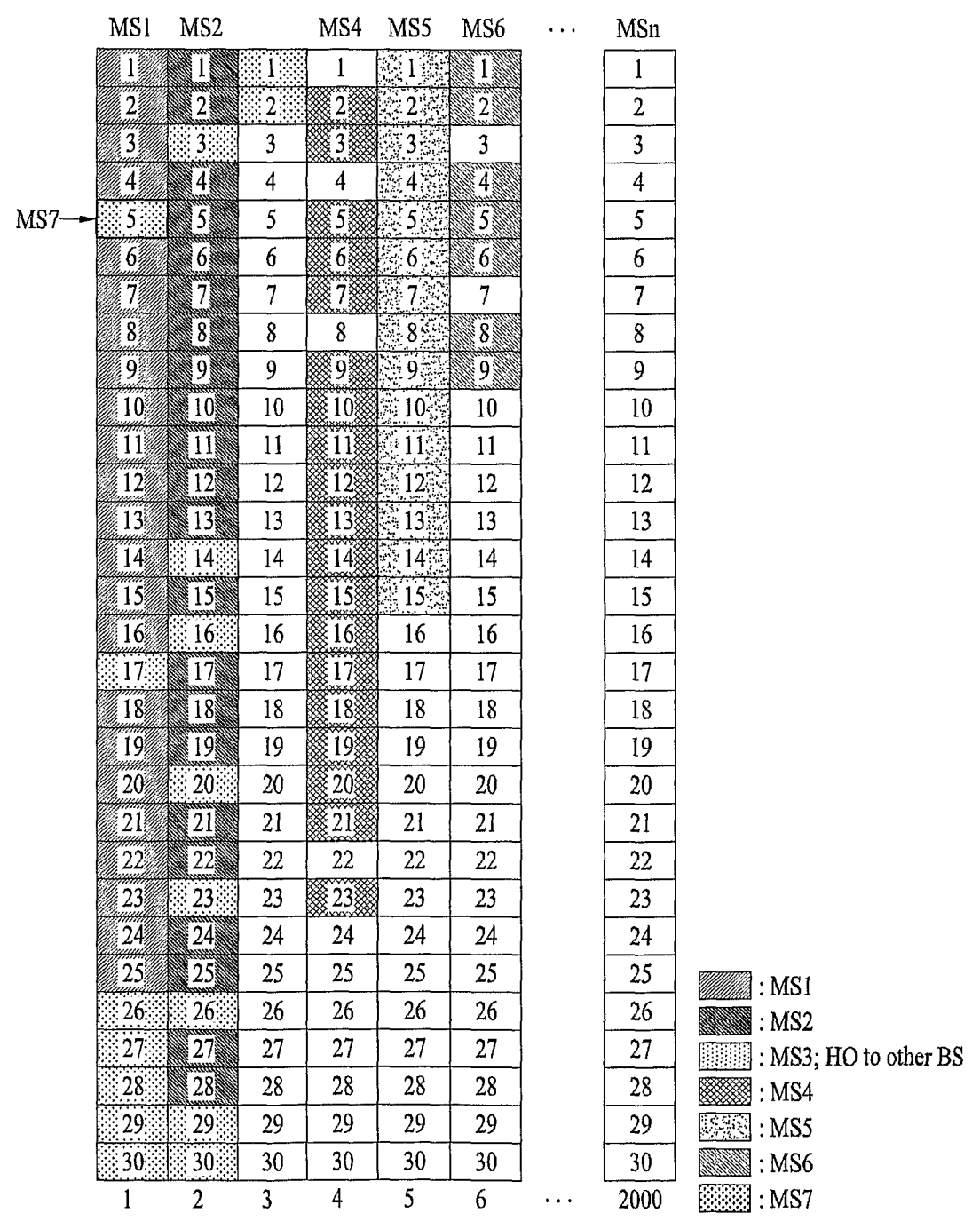

FIG. 6 is a view showing a method of updating TCIDs of a fast handover target MS MS7, according to an embodiment of the present invention.

FIG. 6 shows the allocation positions of the TCIDs of each MS, which are used in the target BS. In FIG. 6, it is assumed that the number of connections which are generated by MS1 and the target BS is 25, the number of connections which are generated by MS2 and the target BS is 30, the number of connections which are generated by MS3 and the target BS is 10, the number of connections which are generated by MS4 and the target BS is 22, the number of connections which are generated by MS5 and the target BS is 15, and the number of connections which are generated by MS6 and the target BS is 13. At this time, each MS requires TCIDs of the number corresponding to the number of connections.

In FIG. 6, MS3 moves from the target BS to another BS such that the TCIDs allocated to MS3 are released, and MS7 tries to perform handover from the serving BS to the target BS. At this time, it is assumed that the number of TCIDs transmitted from MS7 to the serving BS is 16.

The target BS notifies MS7 of the CIDs used in the target BS in advance in a process of performing handover, for fast handover. The SCID and PCID of the target BS are allocated to MS7. The TCIDS of the target BS of the number corresponding to the number of connections required by MS7 used in a current serving BS is required for continuance of the service. Accordingly, 16 TCIDs should be allocated from the target BS to MS7.

Referring to FIG. 6, the target BS may notify MS7 of the TCID allocation start position and the TCID allocable value by the bitmap string. That is, the target BS notifies MS7 that the TCID allocation start position of MS7 is "5" of the first column. The target BS may notify the MS of the allocation positions of the TCIDs allocated to the MS7 using the bitmap string. In one embodiment of the present invention, it is assumed that the TCID allocation positions which may be used by MS7 may be represented using a valid TCIP bitmap in TCIDs 5 to 68 and may be represented in the unit of 8 bits. The bitmap string may be represented in various units.

Accordingly, the TCID bitmap string of MS7 may be represented by "10000000/00001000/00000111/11001000/00000001/01000100/1001 0010/11000000". At this time, the bits which remain after allocating the TCIDs may be filled by "0". MS7 may confirm the TCIDs of the target BS which may be allocated to MS7 using the bitmap string. That is, MS7 can know that the TCIDs of the target BS which may be allocated to MS7 are "5, 17, 26, 27, 28, 29, 30, 33, 44, 46, 50, 53, 56, 59, 61 and 62" using the TCID bitmap string. At this time, the TCIDs may be counted in a vertical direction while traveling to the right side.

The TCIDs allocated by the serving BS may be allocated from a lowest TCID in ascending order or may be allocated on the basis of a service flow ID (SPID).

Figure 7:
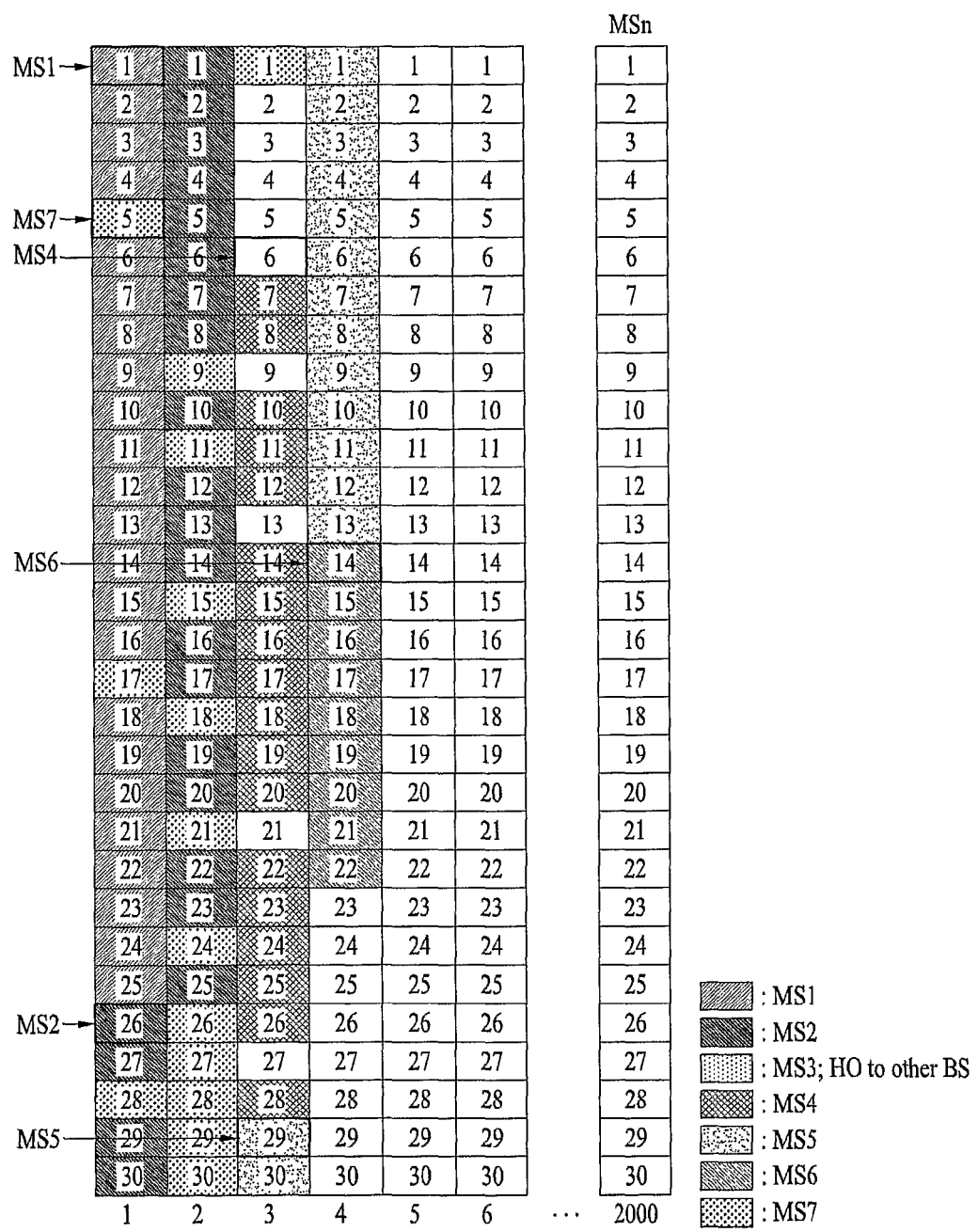
FIG. 7 is a view showing a method of updating TCIDs of a fast handover target MS MS7, according to another embodiment of the present invention.

FIG. 7 is a view showing a method of updating TCIDs of a fast handover target MS MS7, according to another embodiment of the present invention.

FIG. 7 shows the allocation positions of the TCIDs at the target BS as shown in FIG. 5. In FIG. 7, MS7 is an MS which will perform handover to the target BS. In one embodiment of the present invention, the target BS may allocate the TCIDs to the handover target MS in advance, for fast handover. Accordingly, the target BS may notify MS7 of the TCID allocation start position and the TCID allocable value of MS7 while the handover is performed.

It is assumed that the TCID allocation start position which may be allocated from the target BS to MS7 is "5". The target BS may represent the TCID allocable value by the bitmap string on the basis of the TCID allocation start position.

Accordingly, the TCID bitmap string of MS7 may be represented by "10000000/00001000/00000001/00000000/00101000/10010010/0101 1111/10000000". At this time, the bits which remain after allocating the TCIDs may be filled by "0". MS7 may confirm the TCIDs of the target BS which may be allocated to MS7 using the bitmap string. That is, MS7 can know that the TCIDs of the target BS which may be allocated to MS7 are "5, 17, 28, 39, 41, 45, 48, 51, 54, 56, 57, 58, 59, 60 and 61" if the TCID bitmap string is received.

The TCIDs allocated by the serving BS may be allocated from a lowest TCID in ascending order or may be allocated on the basis of a service flow ID (SPID).

FIG. 8 is a view showing a method of updating TCIDs of a fast handover target MS MS8, according to another embodiment of the present invention.

FIG. 8 shows a portion of the TCID structure in which the TCID allocation positions are represented in order of TCID numbers. Referring to FIG. 8, MS1 to MS7 are already included in the cell of the target BS. MS8 is an MS which will perform handover to the target BS. Accordingly, for fast handover, it is preferable that the target BS notifies MS8 of information about the TCIDs which can be provided by the target BS in advance while handover is performed. That is, the target BS may represent the TCID allocable value which may be allocated to MS8 by the bitmap string on the basis of the TCID allocation start position, and allocate the TCIDs to MS8.

In FIG. 8, it is assumed that the TCID allocation start position which may be allocated from the target BS to MS8 is "1014". The TCID bitmap string of MS8 may be represented by "11000000/00111110/01000000/00001111/00100100/10111110". At this time, the bits which remain after allocating the TCIDs may be filled by "0".

Accordingly, MS8 may confirm the TCIDs of the target BS which may be allocated to MS8 using the TCID allocation start position and the bitmap string. That is, MS8 can know that the TCIDs of the target BS which may be allocated to MS8 are "1014, 1015, 1024, 1025, 1026, 1027, 1028, 1031, 1042, 1043, 1044, 1045, 1048, 1051, 1056, 1057, 1058, 1059 and 1060" if the TCID bitmap string is received.

MS8 may receive the allocation information of the TCIDs used in the target BS in advance while handover is performed such that the handover procedure and the ranging and registering procedure to the target BS are rapidly performed.

Figure 9:
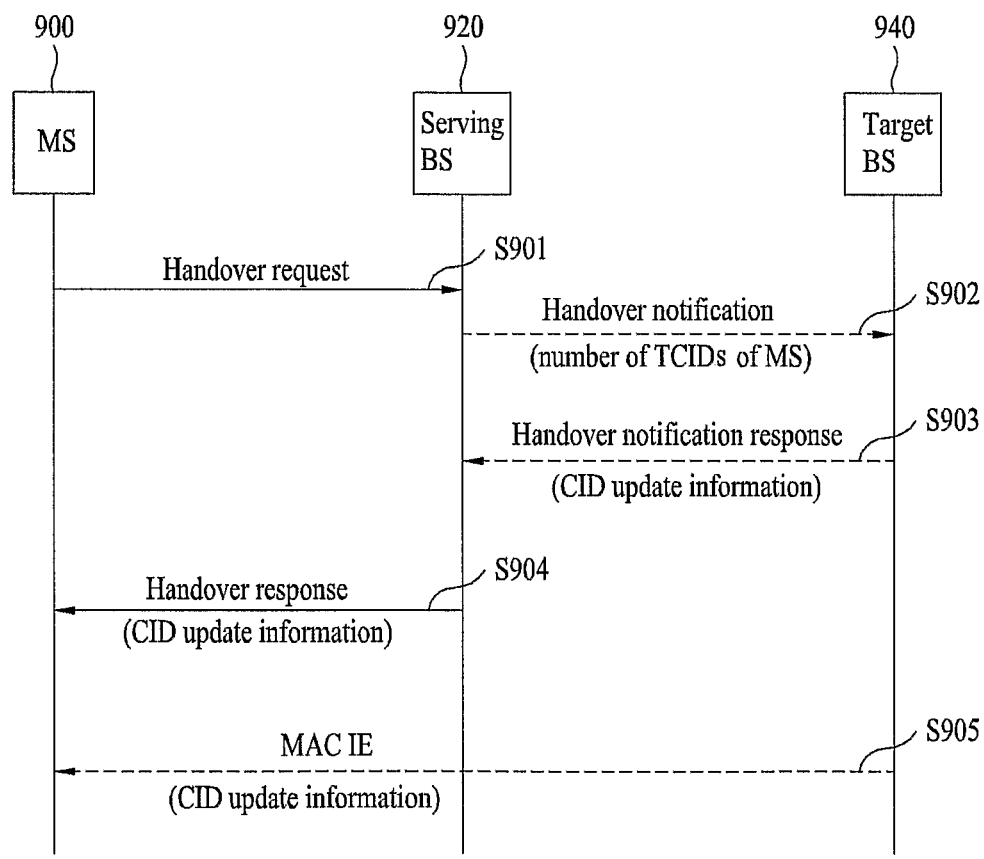
FIG. 9 is a view showing a method of allocating a CID of an MS for fast handover, according to an embodiment of the present invention.

FIG. 9 is a view showing a method of allocating a CID of an MS for fast handover, according to an embodiment of the present invention.

In FIG. 9, a network system may include an MS 900, a serving BS 920 and a target BS 940. The target BS 940 indicates neighbor BSs of the serving BS 920.

When the MS 900 moves while the MS 900 receives a service from the serving BS 920, the target BS 940 needs to perform fast handover for continuance of the service. Accordingly, the MS 900 may transmit a handover request message to the serving BS 920 (S901).

The serving BS 920 may transmit a handover notification message to the target BS 940 in order to notify that the MS 900 requests the handover. The handover notification message may be transmitted to the target BS 940 via a backbone network. The serving BS 920 may include the number of TCIDs for the service transmitted from the current serving BS 920 to the MS 900 in the handover notification message and transmit the handover notification message (S902).

The target BS 940 may check the number of TCIDs which is being used by the MS 900 and is included in the handover notification message and allocate the TCIDs used in the cell of the target BS 940 to the MS 900. Accordingly, the target BS 940 may transmit a handover notification response message including CID update information (e.g., TCID allocation information), which may be allocated to the MS 900, to the serving BS 920 (S903).

The serving BS 920 may include the CID update information included in the handover notification response message in a handover response message and transmit the handover response message to the MS 900 (S904).

In the step S904, the CID update information may include the BCID, the PCID, the TCID allocation start position and the TCID allocable value used in the target BS. The TCID allocable value may be represented using the TCID bitmap string described in FIGS. 6 to 8.

Table 1 shows an example of the CID update information used in the step S904.

TABLE 1

| Name | Type | Length | Value | Scope |
|---|---|---|---|---|
| Pre_CID_update | x | Variable | The compound field contains the subattributes shown in Table 2 | MOB_BSHO-REQ MOB_BSHO-RSP |

TABLE 2

| Name | Type | Length | Value |
|---|---|---|---|
| BCID | x.1 | 2 | New basic CID after HO to new BS |
| PCID | x.2 | 2 | New primary CID after HO to new BS |
| Starting TCID | x.3 | 2 | Starting Transport CID |
| Bitmap | x.4 | Variable | Variable length bitmap string for Transport CID |

The parameters shown in Table 2 may be included in the CID update (Pre CID_update) of Table 1. In Table 2, the TCID allocation start position (starting TCID) parameter specifies the TCID allocation start position. The bitmap parameter represents the bitmap string of the allocated TCIDs. The bitmap string may be represented in the unit of 8 bits on the basis of the TCID allocation start position. If each bit is "1", it is indicated that the TCID is allocated and, if each bit is "0", it is indicated that the TCID is not allocated. If the TCIDs are allocated in the unit of 8 bits, the bits which remain after allocating the TCIDs may be represented by "0". A method of representing the bitmap string may be represented in the unit of various sizes, instead of 8 bits.

An example of the bitmap string of Table 2 is equal to those described in FIGS. 6 to 8. The BCID and the PCID of Table 2 represent the new CIDs allocated from the target BS to the MS.

In the step S904, the serving MS 920 may transmit the handover response message without including the CID update information of the target BS 940 therein. In this case, the target BS 940 may directly notify the MS 900 of the CID update information. That is, the target BS 940 may include the CID update information in an MAC IE (e.g., a fast ranging IE) and directly transmit the MAC IE to the MS 900 after handover is completed and before ranging is performed (S905).

Since the MS 900 may receive the CIDs of the target BS 940 in the handover procedure by the step S904 or S905, it is possible to update the CIDs which will be used in the target BS 940 in advance while the handover is performed. Accordingly, since the MS 900 which performs fast handover can rapidly update the CIDs of the target BS 940, it is possible to minimize the service delay of the MS 900.

Figure 10:
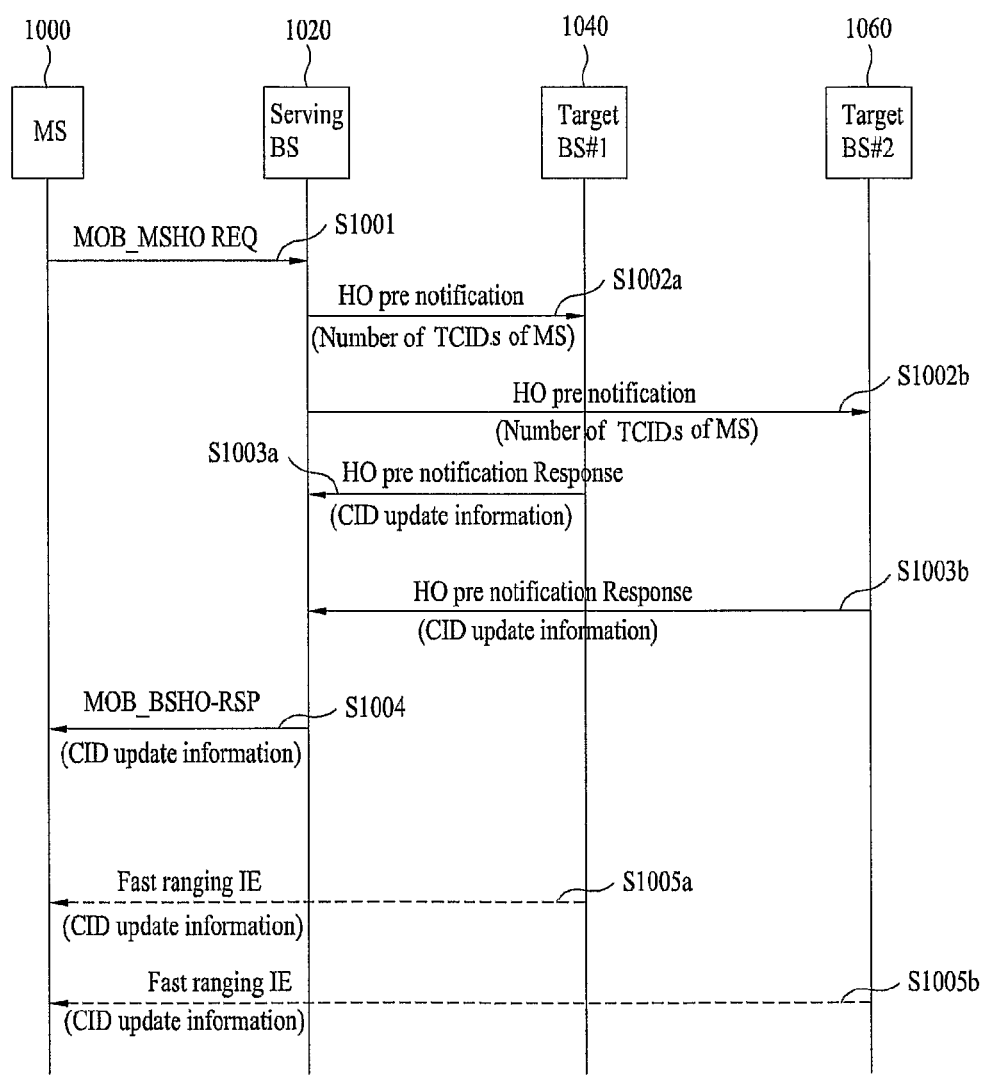
FIG. 10 is a view showing another method of allocating a CID to an MS for fast handover, according to an embodiment of the present invention.

FIG. 10 is a view showing another method of allocating a CID to an MS for fast handover, according to an embodiment of the present invention.

In FIG. 10, a network system may include an MS 1000, a serving BS 1020, a first target BS BS#1 1040, and a second target BS BS#2 1060.

The serving BS 1020 may broadcast information about a network configuration to all MSs in its cell so as to notify all the MSs of information about neighbor BSs. The MS 1000 may scan the neighbor BSs and perform handover on the basis of channel quality information of the neighbor BS acquired by scanning, in order to perform handover.

If the MS 1000 needs to perform fast handover, the MS 1000 transmits a handover request message to the serving BS 1020 in order to perform the fast handover (S1001).

The serving BS transmits a "HO pre notification" message notifying that the MS requests the handover to the first target BS 1040 and the second target BS 1060 (S1002a and S1002b).

In the step S1002, the serving BS may include the number of TCIDs (that is, the number of TCIDs required by the MS for continuance of the service) for the connection between the current serving BS and the MS in the "HO pre notification" message and transmit the "HO pre notification" message to the target BSs.

The first target BS and the second target BS may confirm the number of TCIDs required by the MS using the "HO pre notification" message received in the step S1002. Accordingly, the first target BS and the second target BS may transmit the CID update information which may be allocated to the MS to the serving BS (S1003a and S1003b).

The serving BS may include the CID update information of the target BSs received from the target BSs in an "MOB_BSHO RSP" message and transmit the "MOB_BSHO RSP" message to the MS (S1004). At this time, the CID update information used in the step S1004 may use those described in Table 1 and Table 2.

In the step S1004, the serving BS 1020 may transmit the handover response message without including the CID update information of the target BSs. In this case, the target BSs may perform downlink synchronization with the MS and, at the same time, directly notify the MS 1000 of the CID update information. That is, the target BSs may include the CID update information in an MAC IE (e.g., a fast ranging IE) and directly transmit the MAC IE to the MS 1000 after handover is completed and before ranging is performed (S1005a and S1005b).

Since the MS 1000 may receive the CIDs of the target BS 1040 in the handover procedure by the step S1004 or S1005, it is possible to update the CIDs which will be used in the target BS 1040 in advance while the handover is performed. Accordingly, since the MS 1000 which performs fast handover can rapidly update the CIDs of the target BS, it is possible to minimize the service delay of the MS 1000.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to various radio access systems. Examples of the various radio access systems may include the 3$^{rd}$ generation partnership project (3GPP) system, the 3GPP2 system and/or the Institute of Electrical and Electronic Engineers 802 (IEEE802.xx) system. The embodiments of the present invention are applicable to all technical fields using the various radio access systems as well as the various radio access systems.

The invention claimed is:

1. A method of allocating a connection identifier (CID) when a handover is performed, the method comprising:
    transmitting a handover request message to a serving base station; and
    receiving, at a target base station, a handover response message including CID update information used by the target base station,
    wherein the CID update information includes information of at least one allocated transport CID (TCID) used by the target base station,
    wherein the allocated TCID information includes:
        a start index of an allocation position of the at least one allocated TCID among a plurality of sequentially indexed TCID candidates, and
        a bitmap string having a length of at least one bit, the bitmap string indicating the allocation position of the at least one allocated TCID among the plurality of TCID candidates in order according to the sequential indexes,
    wherein a total number of "1" bits of the bitmap string indicates a total number of the at least one allocated TCID.

2. The method according to claim 1, wherein the CID update information further includes a basic CID (BCID) and a primary CID (PCID).

3. The method according to claim 1, further comprising allocating a TCID allocable value in order from a lowest transmission zone to a highest transmission zone.

4. The method according to claim 1, further comprising allocating a TCID allocable value according to a service flow identifier.

5. A method of allocating a connection identifier (CID) when a handover is performed, the method comprising:
    receiving, at a serving base station, a handover request message from a mobile station;
    transmitting, at a serving base station, a message to the target base station, the message including information about a transport CID (TCID) allocated to the mobile station;
    receiving, at a serving base station, CID update information from the target base station that is used by the target base station; and
    transmitting, at a serving base station, a handover response message to the target base station, the handover response including the CID update information,
    wherein the CID update information includes information of at least one allocated TCID used by the target base station,
    wherein the allocated TCID information includes:
        an index of a start position of the at least one allocated TCID among a plurality of sequentially indexed TCID candidates, and
        a bitmap string having a length of at least one bit, the bitmap string indicating the allocation position of the at least one allocated TCID among the plurality of TCID candidates in order according to the sequential indexes,
    wherein a total number of "1" bits of the bitmap string indicates a total number of the at least one allocated TCID.

6. The method according to claim 5, wherein the CID update information further includes a basic CID (BCID) and a primary CID (PCID).

7. The method according to claim 5, wherein a TCID allocable value is represented in the unit of 8 bits.

8. The method according to claim 5, further comprising allocating a TCID allocable value in order from a lowest transmission zone to a highest transmission zone.

9. The method according to claim 5, further comprising allocating a TCID allocable value according to a service flow identifier.

* * * * *